June 11, 1940.   C. E. FREDERICKSON   2,203,683
DIFFERENTIAL MECHANISM
Filed Feb. 24, 1939   3 Sheets-Sheet 2
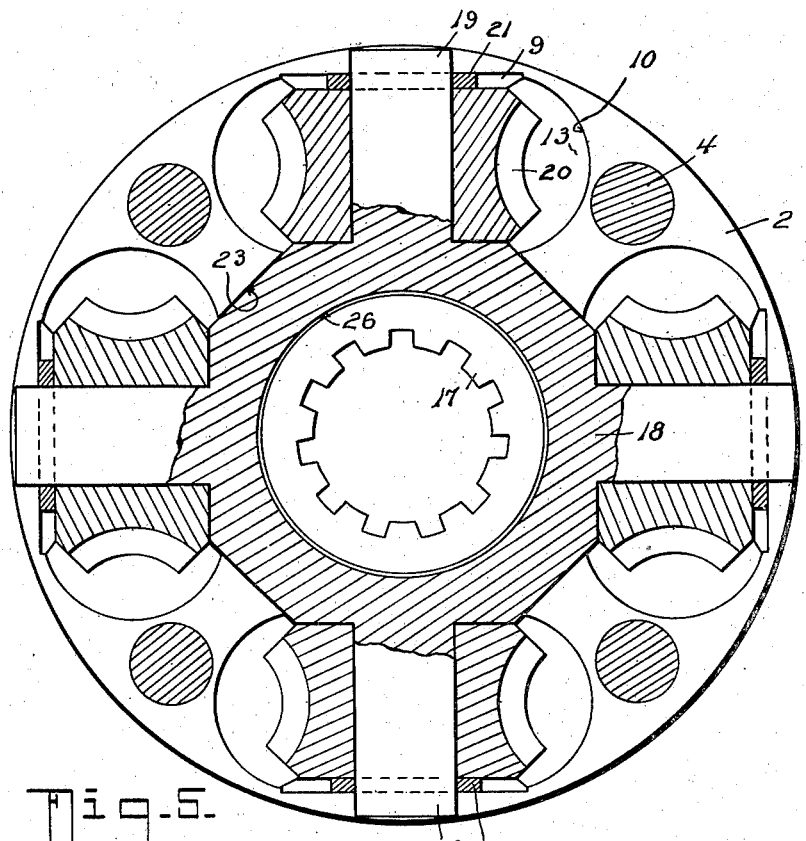
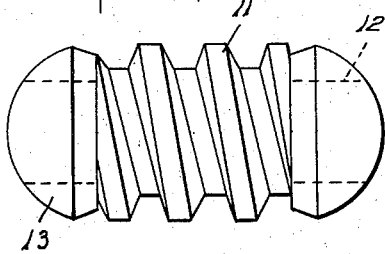
Inventor
Clayton E. Frederickson
By Dieterich & Rutley
Attorneys.

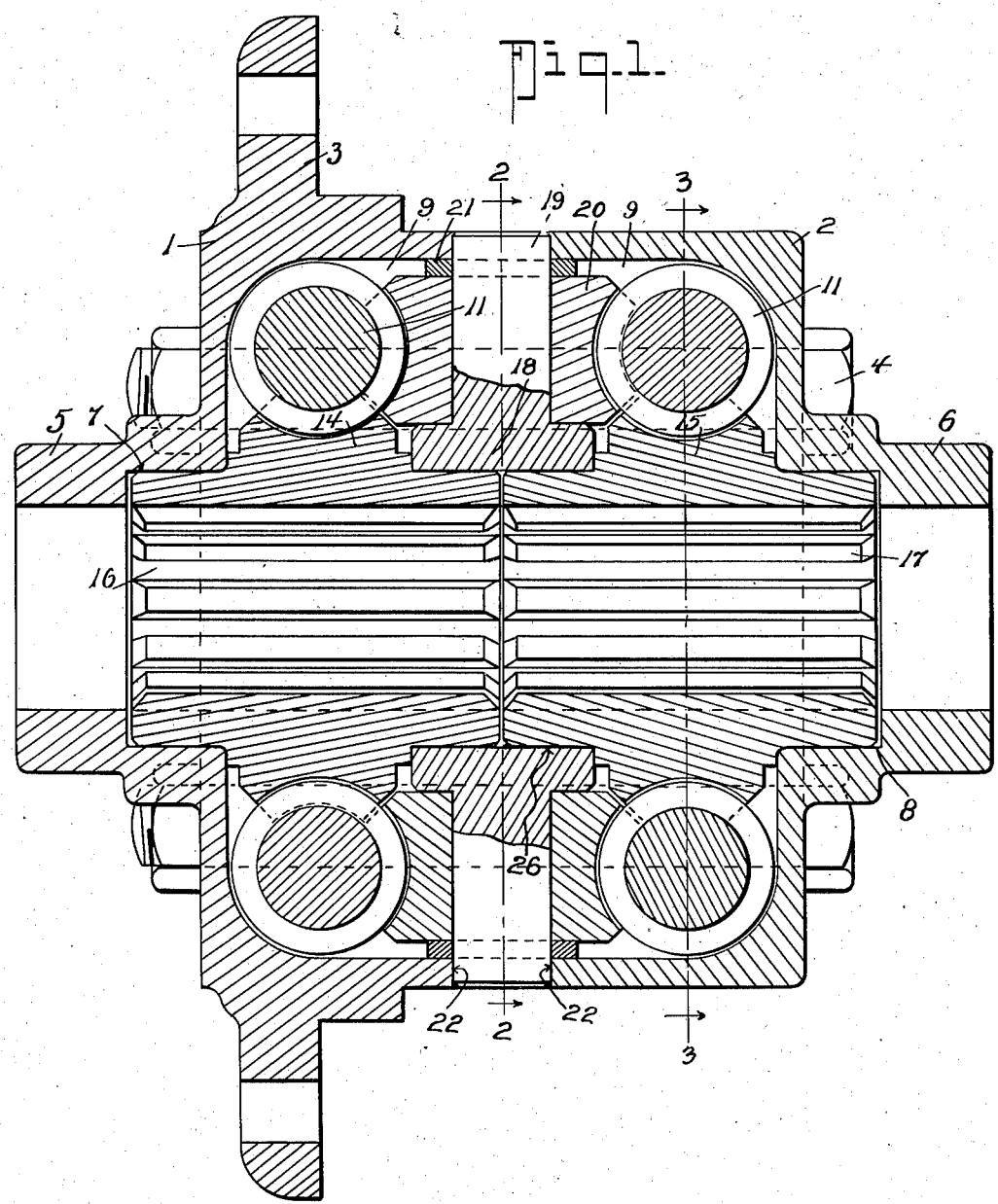

June 11, 1940.  C. E. FREDERICKSON  2,203,683
DIFFERENTIAL MECHANISM
Filed Feb. 24, 1939   3 Sheets-Sheet 3
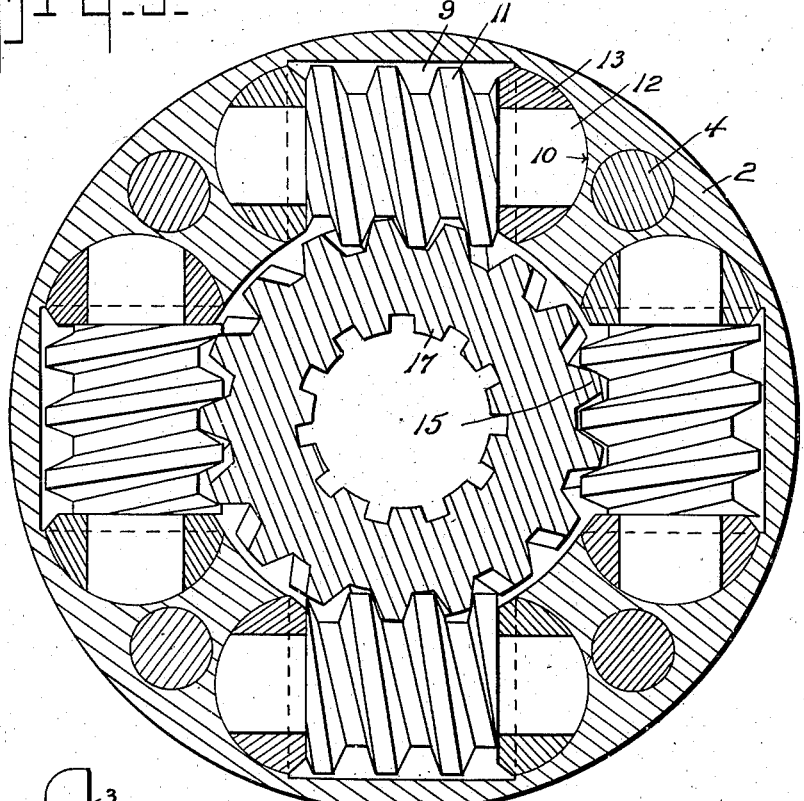
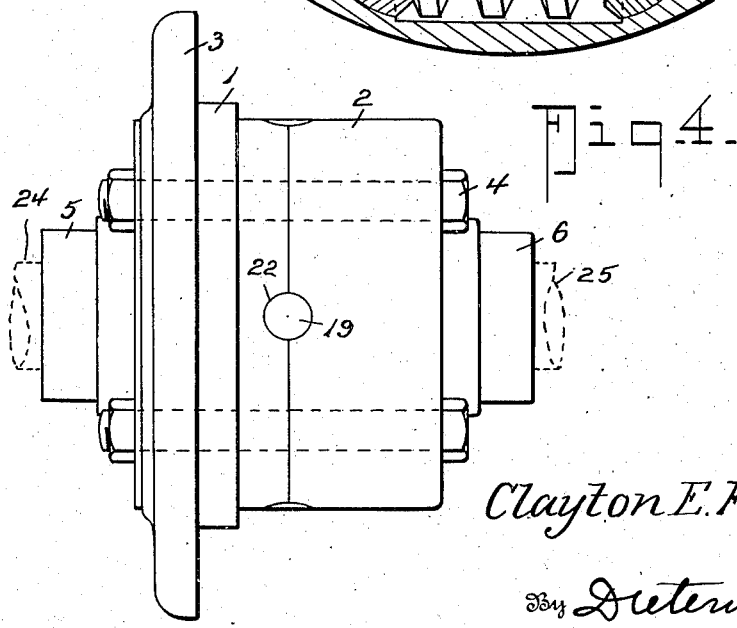
Inventor
Clayton E. Frederickson
By Dieterich & Rutley
Attorneys Patented June 11, 1940

2,203,683

UNITED STATES PATENT OFFICE 2,203,683

DIFFERENTIAL MECHANISM

Clayton Erasmus Frederickson, Chicago, Ill.

Application February 24, 1939, Serial No. 258,317

5 Claims. (Cl. 74—313)

My invention relates to a new and improved differential mechanism, for motor vehicles and the like, where the motion of a transmission shaft is imparted to two other aligned shafts, either of which is differentially rotatable with respect to the other.

Generically the invention seeks to provide an improved differential of rugged construction, especially useful for taxicabs and trucks, wherein differentials are subject to long and hard usage; to provide a differential which will be quiet in operation; to provide an improved differential in which the differential case, to which the usual ring gear is attached, will drive the two aligned shafts directly, thus relieving the strain on the differential pinions and their shafts.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a central vertical longitudinal section of a differential embodying my invention.

Fig. 2 is a cross section thereof on the line 2—2 of Fig. 1.

Fig. 3 is a cross section on the line 3—3 of Fig. 1.

Fig. 4 is an elevation of the differential.

Fig. 5 is a detail elevation of one of the key-worms and its bearings.

In the drawings, in which like numerals of reference indicate like parts in all the figures, 1 and 2 represent respectively the two halves of the case and 3 the flange to which the usual ring gear (not shown) is attached, the halves being secured together by bolts and nuts 4.

Each half 1 and 2 has a hub, 5 and 6 respectively, to receive the respective driven shafts 24 and 25 (see dotted lines, Fig. 4). Each half 1 and 2 also has a recess 7, 8 respectively serving as bearings for the internally splined collars 16 and 17 of the worm gears 14 and 15, respectively.

Pockets 9 are formed in each case half 1 and 2 for the reception of the key-worms 11. These worms 11 have their shaft ends 12 held in semi-spherical bearings 13 which lie in the similarly shaped ends 10 of the recesses 9.

A spider 18 having radial stub shafts 19 is fitted into recesses 22 and 23 in the case. The spider has a circular bore 26 to fit on the sleeves 16 at their adjacent ends, and on the shafts 19 are mounted the worm or spiral pinions 20 which mesh with the key-worms 11, the key-worms 11 in turn meshing with worm gears 14 and 15 respectively. Washers 21 on the shafts 19 are interposed between the spiral pinions 20 and the case 1, 2.

Operation

When the vehicle employing my invention is in use and is running straight-way, case 1, 2 will be turned by the power applied through flange 3 and gears 14 and 15 will be turned by the force applied directly by the case through key-worms 11, the worms being held from turning by the spiral pinions 20 on spider shafts 18 which turn with the case.

When, however, the vehicle turns, the faster moving shaft 24 or 25, as the case may be, will cause key-worms 11 and spiral pinions 20 to differentiate the movement of case 1, 2, while at all times power is applied to both driven shafts to turn the same.

Since the action of spiral-key-pinion connections between the two shafts 24, 25 and case 1, 2 is somewhat more sluggish than in the case of the usual bevel pinion types of differentials, sufficient drive will be applied to both shafts to obtain sufficient traction (even though one shaft's traction wheel is in a slippery place) to pull the vehicle out of a slippery place into which one wheel only has passed.

From the foregoing description, taken in connection with the accompanying drawings, it is thought that the construction, operation and advantages of the invention will be clear to those skilled in the art to which it relates.

What I claim is:

1. In a differential mechanism, a rotatable driven member having passages, a pair of sleeves rotatably mounted in said driven member, each having provision for fitting the end of a shaft and mounted to turn about a common axis, a spider carried by said driven member and rotatable therewith, said spider having stub shafts and having a ring-bearing on said sleeves, pinions rotatably mounted on said stub shafts, said sleeves having gear elements, and means carried by said casing for operatively connecting said pinions with the respective gear elements for differentiation and driving purposes, said means comprising key-worms, said key-worms having shaft ends, semi-spherical bearing elements on said ends, said driven member having pockets with spherical surface ends to receive said key-worms and their bearing elements.

2. In a differential mechanism, a two-part case having shaft-receiving hubs, and sleeve bearing portions, a pair of sleeves mounted in said case in axial alignment with said hubs and having provision to receive and rotate with driven shafts, each of said sleeves having a worm gear, a spider with stub shafts mounted in and turning with said case about a common axis of said sleeves and hubs, spiral pinions on said stub shafts, and key-worms mounted in and movable with said case and connecting said spiral pinions with the respective worm gears, said key-worms having shaft ends, semi-spherical bearing elements on said ends, said case having pockets with spherical surface ends to receive said key-worms and their bearing elements.

3. In a differential mechanism, a two-part case, means to secure the parts together, a ring gear receiving member on said case, said case being rotatable about an axis, a spider having stub shafts mounted in and movable with said case as a unit, said case and said spider having sleeve bearings, two internally splined sleeves having gear elements and mounted end to end in said sleeve bearings and freely rotatable about said axis of said case, pinions mounted on said stub shafts, and members carried by said case and operatively connecting said pinions to said sleeve gear elements for differential movement, said gear elements comprising spiral gears, said pinions comprising spiral pinions, and said connecting members comprising key-worms, said key-worms having shaft ends, semi-spherical bearing elements on said ends, said case having pockets with spherical surface ends to receive said key-worms and their bearing elements.

4. In a differential mechanism, a case having shaft receiving hubs and sleeve bearing portions and stub shaft receiving holes, a pair of sleeves mounted in said case in axial alignment with said hubs and having provisions to receive and rotate with driven shafts, each of said sleeves having a worm gear, a spider comprising a ring-bearing mounted on said sleeves so that the sleeves will turn in said ring-bearing, stub shafts radiating from said ring-bearing and rigid therewith and having their ends held in said stub shaft receiving holes, whereby the spider will turn with the case about a common axis of said sleeves and hubs, spiral pinions rotatably mounted on said stub shafts, key-worms mounted in and movable with said case and connecting said spiral pinions with the respective worm gears, said case having flat surface portions and said spider having flat surface portions on the periphery of its ring-bearing portion to be engaged by the flat surface portions of the case.

5. In a differential mechanism, a case having shaft receiving hubs and sleeve bearing portions and stub shaft receiving holes, a pair of sleeves mounted in said case in axial alignment with said hubs and having provisions to receive and rotate with driven shafts, each of said sleeves having a worm gear, a spider comprising a ring-bearing mounted on said sleeves so that the sleeves will turn in said ring-bearing, stub shafts radiating from said ring-bearing and rigid therewith and having their ends held in said stub shaft receiving holes, whereby the spider will turn with the case about a common axis of said sleeves and hubs, spiral pinions rotatably mounted on said stub shafts, key-worms mounted in and movable with said case and connecting said spiral pinions with the respective worm gears, said case being in two parts with the separation plane normal to said axes and containing the axes of said stub shafts, said stub shafts serving to key the case parts together, and cross bolts holding the case parts assembled, said case having flat surface portions and said spider having flat surface portions on the periphery of its ring-bearing portion to be engaged by the flat surface portions of the case.

CLAYTON ERASMUS FREDERICKSON.